US011144668B2

(12) United States Patent
Jiang et al.

(10) Patent No.: US 11,144,668 B2
(45) Date of Patent: Oct. 12, 2021

(54) COGNITIVELY HIDING SENSITIVE CONTENT ON A COMPUTING DEVICE

(71) Applicant: INTERNATIONAL BUSINESS MACHINES CORPORATION, Armonk, NY (US)

(72) Inventors: Ming Zhe Jiang, Beijing (CN); Kai Huang, Beijing (CN); Dong Jun Zong, Beijing (CN); Wei Hua Wang, Beijing (CN); Wei Li, Huilongguan Town (CN); FengLi Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/541,360

(22) Filed: Aug. 15, 2019

(65) Prior Publication Data
US 2021/0049297 A1 Feb. 18, 2021

(51) Int. Cl.
*G06F 21/00* (2013.01)
*G06F 21/62* (2013.01)
(Continued)

(52) U.S. Cl.
CPC ........ *G06F 21/6245* (2013.01); *G06F 21/604* (2013.01); *G06N 5/02* (2013.01); *H04W 12/033* (2021.01)

(58) Field of Classification Search
CPC ............... G06F 21/6245; G06F 21/604; G06F 2221/032; G06F 21/84; H04W 12/033; H04W 12/02; G06N 5/02
See application file for complete search history.

(56) References Cited

U.S. PATENT DOCUMENTS 8,131,281 B1 * 3/2012 Hildner ............... H04L 41/0806
455/418
9,203,791 B1 * 12/2015 Olomskiy ............... G06F 21/82
(Continued)

FOREIGN PATENT DOCUMENTS

CN 102006358 A 4/2011
CN 104796531 A 7/2015
(Continued)

OTHER PUBLICATIONS

Disclosed Anonymously, "Automatic obfuscation of sensitive content on locked devices", An IP.com Prior Art Database Technical Disclosure, Publication Date: Nov. 15, 2018, 8 pages, IP.com No. IPCOM000256262D, Retrieved from the Internet: <https://priorart.ip.com/IPCOM/000256262>.

(Continued)

*Primary Examiner* — John B King
(74) *Attorney, Agent, or Firm* — Steven M. Bouknight

(57) ABSTRACT

A method for automatically detecting and concealing content associated with an incoming notification in response to receiving and presenting the incoming notification on a computing device is provided. The method may include receiving the incoming notification on a computing device. The method may further include extracting and categorizing different parts of the incoming notification, and identifying features associated with each of the different parts. The method may further include classifying different parts of the content within the incoming notification based on a class coding system and identifying instructions associated with each classification. The method may further include detecting user behavior with respect to similar notifications. The method may also include automatically determining whether to conceal, partially conceal, or display on the computing device the content within the notification. The method may (Continued)

further include presenting the incoming notification on the computing device according to the automatic determination.

20 Claims, 9 Drawing Sheets

(51) Int. Cl.
*G06N 5/02* (2006.01)
*G06F 21/60* (2013.01)
*H04W 12/033* (2021.01)

(56) References Cited

U.S. PATENT DOCUMENTS

| | | | | |
|---|---|---|---|---|
| 9,477,836 | B1* | 10/2016 | Ramam | G06F 21/6263 |
| 10,630,630 | B1* | 4/2020 | Khawand | H04M 1/67 |
| 10,671,753 | B2* | 6/2020 | Allen | G06F 21/6263 |
| 2004/0082294 | A1* | 4/2004 | Ekl | H04L 1/0066 |
| | | | | 455/3.05 |
| 2006/0246956 | A1* | 11/2006 | Park | G06F 3/0485 |
| | | | | 455/566 |
| 2007/0204329 | A1* | 8/2007 | Peckover | H04L 63/08 |
| | | | | 726/3 |
| 2008/0052759 | A1* | 2/2008 | Kronlund | G06F 21/84 |
| | | | | 726/2 |
| 2008/0060051 | A1* | 3/2008 | Lim | H04L 63/10 |
| | | | | 726/1 |
| 2011/0119576 | A1* | 5/2011 | Aumann | G06F 40/16 |
| | | | | 715/255 |
| 2011/0173676 | A1* | 7/2011 | Peckover | G16H 40/67 |
| | | | | 726/3 |
| 2013/0217332 | A1* | 8/2013 | Altman | H04W 4/025 |
| | | | | 455/41.2 |
| 2013/0246173 | A1* | 9/2013 | Berkley | G06Q 30/02 |
| | | | | 705/14.53 |
| 2014/0256288 | A1* | 9/2014 | Allen | H04W 12/02 |
| | | | | 455/411 |
| 2015/0007351 | A1* | 1/2015 | Janajri | H04L 51/00 |
| | | | | 726/30 |
| 2017/0193386 | A1* | 7/2017 | Qin | H04L 67/10 |
| 2018/0046929 | A1* | 2/2018 | Xuan | G06Q 10/00 |
| 2018/0123796 | A1* | 5/2018 | Jiang | G06K 9/0002 |
| 2018/0359207 | A1* | 12/2018 | Chatterjee | H04L 51/12 |
| 2019/0065777 | A1* | 2/2019 | Ravuvari | G06F 21/32 |
| 2019/0102574 | A1* | 4/2019 | Roberts | G06Q 30/0631 |
| 2020/0067861 | A1* | 2/2020 | Leddy | H04L 51/12 |
| 2020/0106877 | A1* | 4/2020 | Ledvina | H04W 4/026 |
| 2020/0304289 | A1* | 9/2020 | Androulaki | G06F 21/64 |

FOREIGN PATENT DOCUMENTS

| | | | | |
|---|---|---|---|---|
| CN | 106534572 A | 3/2017 | | |
| CN | 106817489 A | 6/2017 | | |
| WO | WO-03015343 A1 * | 2/2003 | | H04W 4/14 |
| WO | WO-2016082194 A1 * | 6/2016 | | H04L 51/18 |
| WO | WO-2016116932 A1 * | 7/2016 | | G06F 21/602 |
| WO | 2017166667 A1 | 10/2017 | | |

OTHER PUBLICATIONS

Mell et al., "The NIST Definition of Cloud Computing", National Institute of Standards and Technology, Special Publication 800-145, Sep. 2011, 7 pages.

* cited by examiner

| No. | Tokens 302 | Classes of Tokens 304 | Sender 306 | Time 308 | Tag 310 |
|---|---|---|---|---|---|
| 1 | job | 1 | Person1 | 10:00am | hide |
| 2 | job | 1 | Person1 | 8:00pm | display |
| 3 | number(verification code) | 0(2) | App1 | 10:00am | hide |
| 4 | number(validation code) | 0(2) | App2 | 6:00pm | hide |
| 5 | number(account) income number(balance) | 0(3) 4 0(5) | App3 | 11:00am | hide |
| 6 | number(account) | 0(3) | App4 | 12:00am | hide |
| 7 | number(candy) box | 0(6) 7 | Person2 | 10:00am | display |
| 8 | job | 1 | Person3 | 10:00am | display |
| 9 | number(account) | 0(3) | Person4 | 12:00am | display |

FIG. 3

| User's behavior (input vector) 502 | Description 504 | Time relevant 506 | Weight of Importance & Confidential 508 |
|---|---|---|---|
| read (x1) | | yes | high (w1) |
| copy (x2) | | | medium (w2) |
| reply (x3) | | yes | high (w3) |
| share (x4) | Share the message to friends or friend circle | yes | high (w4) |
| forward (x5) | Forward the message to other contacts | | unknown (w5) |
| delete (x6) | | | low (w6) |

COGNITIVELY HIDING SENSITIVE CONTENT ON A COMPUTING DEVICE

BACKGROUND

The present invention relates generally to the field of computing, and more specifically, to data management of notifications on a mobile device.

Generally, mobile devices can receive notifications which may be displayed on a screen associated with the mobile device. For example, a notification that includes an incoming message can be shown on a mobile device's screen to notify the user of the incoming message and allow the user to check and/or interact with the information associated with the incoming message. Additionally, the mobile device may include a feature called a screen lock mode, whereby the mobile device may be idle and locked, or the mobile device screen may be deliberately locked or inaccessible to an individual without a password and/or a gesture (i.e. a touch or swipe of the screen). In some cases, when the mobile device is in the screen lock mode, the mobile device may still receive notifications on the screen, whereby the notifications may or may not include certain information depending on mobile device settings.

SUMMARY

A method for automatically detecting and concealing content associated with an incoming notification in response to receiving and presenting the incoming notification on a computing device is provided. The method may include in response to receiving an incoming notification, extracting and categorizing different parts of the incoming notification, and identifying features associated with each of the different parts, wherein the different parts comprise at least one sender, a time, and content within the incoming notification. The method may further include classifying different parts of the content within the incoming notification based on a class coding system and identifying one or more instructions associated with each classification. The method may also include automatically determining whether to conceal, partially conceal, or display on the computing device the content within the incoming notification based on the identified features associated with the different parts of the incoming notification and the instructions associated with each classification of the different parts of the content within the incoming notification. The method may further include presenting the incoming notification on the computing device according to the automatic determination whether to conceal, partially conceal, or display the content within the incoming notification.

A computer system for automatically detecting and concealing content associated with an incoming notification in response to receiving and presenting the incoming notification on a computing device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include in response to receiving an incoming notification, extracting and categorizing different parts of the incoming notification, and identifying features associated with each of the different parts, wherein the different parts comprise at least one sender, a time, and content within the incoming notification. The method may further include classifying different parts of the content within the incoming notification based on a class coding system and identifying one or more instructions associated with each classification. The method may also include automatically determining whether to conceal, partially conceal, or display on the computing device the content within the incoming notification based on the identified features associated with the different parts of the incoming notification and the instructions associated with each classification of the different parts of the content within the incoming notification. The method may further include presenting the incoming notification on the computing device according to the automatic determination whether to conceal, partially conceal, or display the content within the incoming notification.

A computer program product for automatically detecting and concealing content associated with an incoming notification in response to receiving and presenting the incoming notification on a computing device is provided. The computer program product may include one or more computer-readable storage devices and program instructions stored on at least one of the one or more tangible storage devices, the program instructions executable by a processor. The computer program product may include program instructions to, in response to receiving an incoming notification, extract and categorize different parts of the incoming notification, and identifying features associated with each of the different parts, wherein the different parts comprise at least one sender, a time, and content within the incoming notification. The computer program product may further include program instructions to classify different parts of the content within the incoming notification based on a class coding system and identifying one or more instructions associated with each classification. The computer program product may further include program instructions to automatically determine whether to conceal, partially conceal, or display on the computing device the content within the incoming notification based on the identified features associated with the different parts of the incoming notification and the instructions associated with each classification of the different parts of the content within the incoming notification. The computer program product may also include program instructions to present the incoming notification on the computing device according to the automatic determination whether to conceal, partially conceal, or display the content within the incoming notification.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is an exemplary diagram illustrating the natural language processing techniques associated with an aspect of the present invention according to one embodiment;

DETAILED DESCRIPTION

Figure 1:
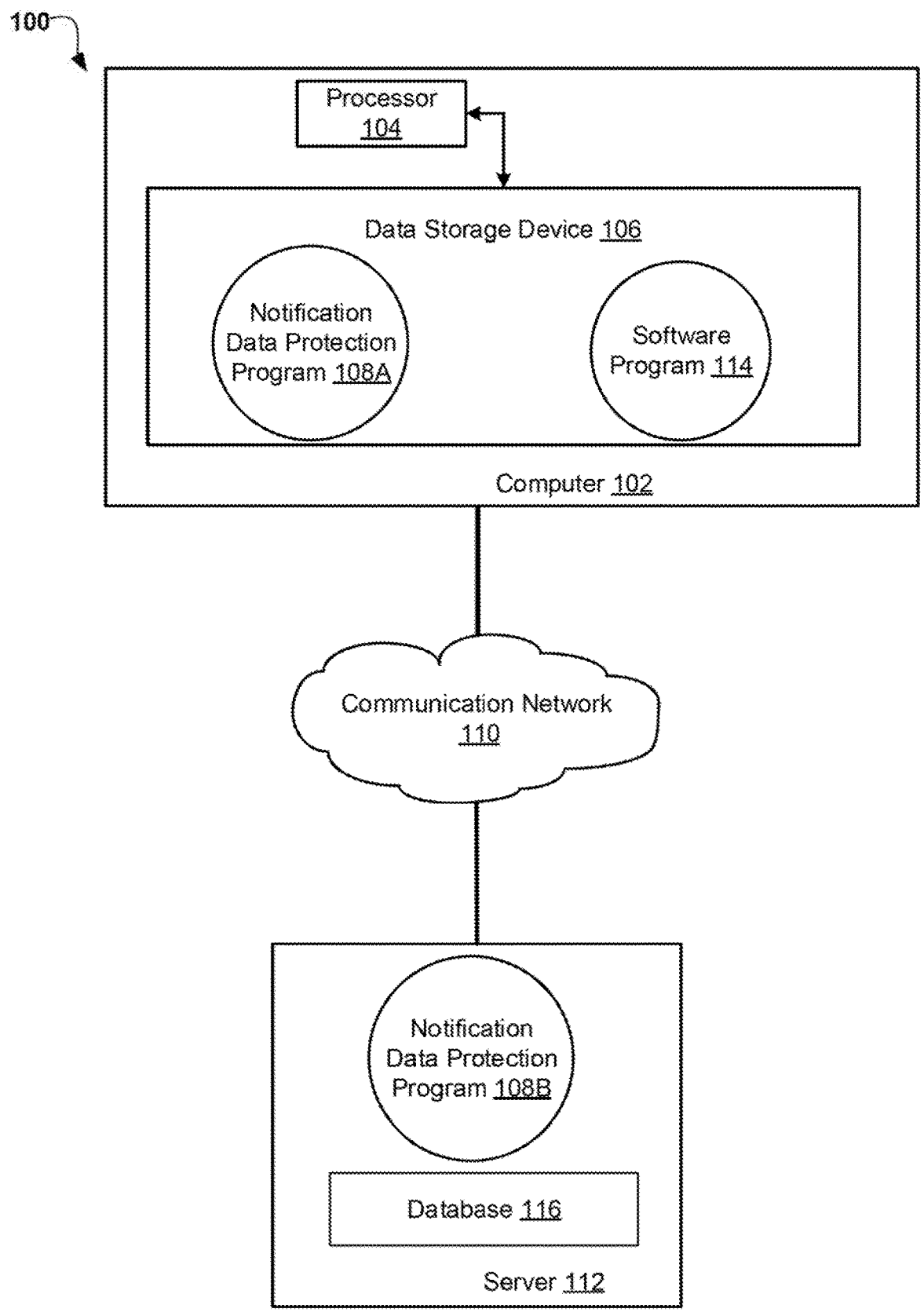
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data processing and management. The following described exemplary embodiments provide a system, method and program product for automatically and cognitively detecting and concealing content associated with an incoming notification in response to receiving and presenting the incoming notification on a computing device. Specifically, the present embodiment has the capacity to improve the technical field associated with presenting notifications on a computing device, such as a mobile device. by automatically and cognitively concealing certain content within a notification when dynamically presenting the notification on a computing device. More specifically, the system, method and program product may use a combination of a prediction model, a behavior driven model, and a feedback model to cognitively and dynamically determine and detect sensitive and confidential data, as well as cognitively and dynamically conceal the sensitive and confidential data when presenting notifications on a computing device.

As previously described with respect to mobile device notifications, a notification may include an incoming message associated with an application that can be shown on a mobile device screen to notify the user of the incoming message and allow the user to check and/or interact with the information associated with the incoming message. A user's mobile device may also include a screen lock mode, where the mobile device screen may be locked to detract others from accessing the full features and applications on the mobile device. In a screen lock mode, the mobile device may still receive notifications on the screen. However, even in screen lock mode, sensitive information (such as personal information, account information, and passwords) may be contained in the notification/message, which can be seen on the mobile device screen by anyone without any safeguards. In turn, failure to safeguard such information can cause loss of privacy, property, and/or business.

Common solutions to this issue may include not showing certain notifications on the mobile device screen at all. However, for example, in cases where the notification is time sensitive (such as in an emergency, and/or needing an immediate reply), failure to present the notification can lead to unwanted consequences. Another solution may include showing the notification without any content in the notification (i.e. by simply indicating the name of the application associated with the notification without actual content in the notification). In this case, a user will not be able to quickly check content in the notification without first unlocking the mobile device, and in turn, may miss important information similar to the scenario where no notification is presented at all. An even further solution may include predefining contacts and applications from which to receive notifications based on a user manually setting parameters (such as application name, contact number, contact name, etc.) to encrypt the incoming notification/message belonging to the manually set parameters. One of the deficiencies in this scenario is that the parameters have to be predefined/set by the user. Furthermore, the sensitive data is detected primarily based off the sender or contact. In this case, there may be unforeseen contacts and sensitive information not caught by the user. Furthermore, each time a user may catch the contact and/or sensitive information, the user would again have to go into the mobile device's setting to define parameter.

As such, it may be advantageous, among other things, to provide a method, computer system, and computer program product for automatically and cognitively detecting and concealing certain content associated with a notification when dynamically presenting the notification on a computing device. Specifically, the method, computer system, and computer program product may use a combination of a prediction model, a behavior driven model, and a feedback model to cognitively and dynamically determine and detect sensitive and confidential data, as well as cognitively and dynamically conceal the sensitive and confidential data when presenting notifications on a computing device.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run a notification data protection program 108A and a software program 114, and may also include a microphone (not shown). The software program 114 may be an application program such as an internet browser and/or one or more mobile apps running on a client computer 102, such as a mobile phone device. The notification data protection program 108A may communicate with the software program 114. The networked computer environment 100 may also include a server 112 that is enabled to run a notification data protection program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the notification data protection program 108A, 108B may interact with a database 116 that may be embedded in various storage devices, such as, but not limited to, a mobile device 102, a networked server 112, or a cloud storage service.

According to the present embodiment, a program, such as a notification data protection program 108A and 108B may run on the client computer 102 and/or on the server computer 112 via a communications network 110. The notification data protection program 108A, 108B may provide data protection for notifications received on the client computer 102. Specifically, a user using a client computer 102, such as a mobile device, may run a notification data protection program 108A, 108B, that may interact with a database 116 and a software program 114, to automatically and cognitively detect and conceal protected/sensitive data associated with a notification and dynamically present the notification with the protected/sensitive data concealed on the mobile device. More specifically, the notification data protection program 108A, 108B may use a combination of a prediction model, a behavior driven model, and a feedback model to cognitively and dynamically determine and detect sensitive data, as well as cognitively and dynamically conceal the sensitive data when presenting notifications that may include such sensitive data.

Figure 2:
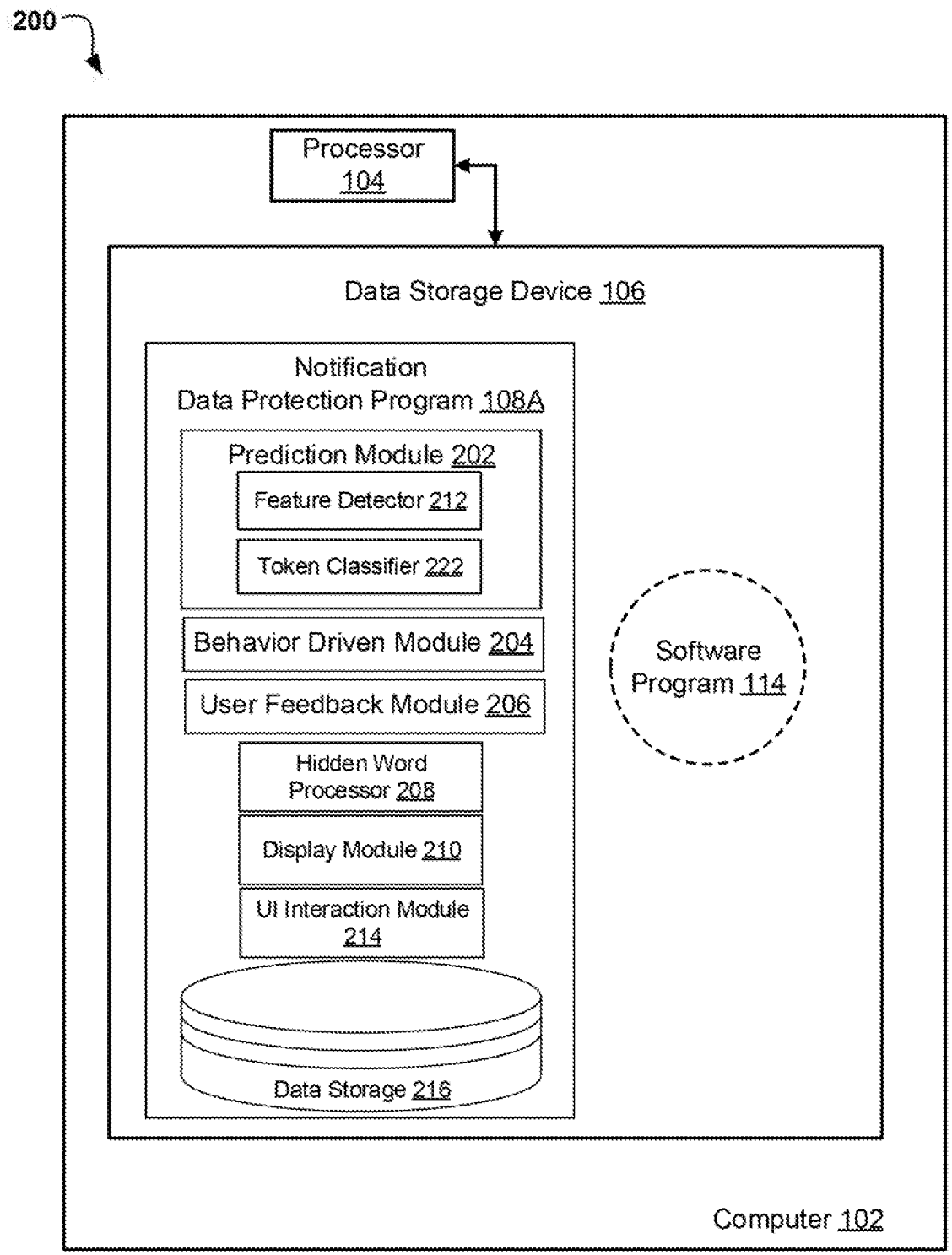
FIG. 2 is a block diagram illustrating the system architecture of a notification data protection program according to one embodiment.

Referring now to FIG. 2, a block diagram 200 illustrating the system architecture of a notification data protection program 108A (FIG. 1) according to one embodiment is depicted. As previously described, the notification data protection program 108A, 108B may run on the client computer 102 (FIG. 1) and/or the server computer 112 (FIG. 1). For illustrative brevity, only an expanded view of the system architecture of the notification data protection program 108A (FIG. 1) running on client computer 102 is shown in FIG. 2. As illustrated in FIG. 2, the notification data protection program 108A may include a prediction module 202, a behavior driven module 204, and a user feedback module 206. As previously described, the notification data protection program 108A, 108B may use a combination of a prediction model, a behavior driven model, and a feedback model to cognitively and dynamically determine and detect protected/sensitive data, as well as cognitively and dynamically conceal the protected/sensitive data when presenting notifications. Specifically, the prediction module 202, the behavior driven module 204, and the user feedback module 206 may interact with one another to determine or define what constitutes protected/sensitive data. Additionally, when presenting a notification, the prediction module 202, the behavior driven module 204, and the user feedback module 206, may determine whether content within the notification should be hidden, partially hidden, and/or displayable based on the training data.

According to one embodiment, the prediction module 202 may include training data to determine and detect protected/sensitive data. According to one embodiment, the training data may include default data processing instructions that is manually inputted by a system administrator, which is then cognitively interpreted by the notification data protection program 108A (FIG. 1) for dynamically processing received notifications. The default data processing instructions may, for example, include instructions to hide banking account information within a notification associated with a banking app. Also, according to one embodiment, the training data may be cognitively received by the prediction module 202 from the behavior driven module 204 and/or the user feedback module 206. The prediction module 202 may also include natural language processing techniques in association with the training data to determine and detect protected/sensitive data. The natural language processing techniques associated with the prediction module 202 may include a feature detector 212 that may split an incoming notification into parts that includes and identifies a sender of the notification, a time that the notification is received, and one or more content/tokens (i.e. keywords, characters, numbers, and/or phrases) within the notification. The feature detector 212 may also identify the features of the different parts of the notification, whereby identifying the features includes identifying the type of sender (i.e. a person, an app, a device/system, etc.), a type of time (i.e. working hours, non-working hours, busy, not busy, sleep, awake, etc.), and a type of token (i.e. a type of number, a type of an event, a type of subject—job, bank, medical, etc.). Furthermore, the notification data protection program 108A may include a token classifier 222 that may further classify the tokens, or keywords/phrases, based on the features of the tokens identified by the feature detector 212. According to one embodiment, the token classifier 222 may classify each token using a class coding system that includes a number and/or series of numbers.

As previously described, the behavior driven module 204 may be used to train the prediction module 202. Specifically, based on user behavior, the behavior driven module 204 may be used to help determine whether certain notifications, and/or certain data within a notification, are important or unimportant, and/or confidential to the user. For example, when a message is received from a messaging application, the notification data protection program 108A (FIG. 1) may capture the user's behavior with respect to the message and may make a record of the captured user's behavior on the behavior driven module 204, whereby the user's behavior may include actions such as: reading the message, copying the message, replying to the message, sharing/forwarding the message, deleting the message, deleting content within the message, locking the message, etc. Thereafter, the recorded user's behavior with respect to the received message may be used as training data for the prediction module 202 to determine whether the messaging application notification, and/or certain data within the messaging application notification, is important or unimportant, and/or confidential to the user.

Also, and as previously described, the user feedback module 206 may be used to train the prediction module 202, as well as train the behavior module 204. Specifically, using a user interface (UI) interaction module 214, the notification data protection program 108A (FIG. 1) may capture user feedback to one or more prediction results that are provided by the prediction module 202, and may make a record of the captured feedback on the user feedback module 206 for training purposes. For example, the prediction module 202 may provide a prediction result whereby the prediction result includes certain data from an application notification that the prediction module 202 deems not protected/sensitive data and designates that certain data as displayable within the notification. However, the user may want such data to be hidden when the notification is displayed, and the notification data protection program 108A (FIG. 1) may allow the user to hide such data using a user interface, such as the UI interaction module 214. Thereafter, the user feedback including the user changing the designation of that certain data to hidden in the UI interaction module 214 may be recorded by the user feedback module 206 and provided as training data to the prediction module 202 and the behavior module 204 for future notifications.

According to one embodiment, the notification data protection program 108A (FIG. 1) may receive notifications and notification data from a software program 114. The software program 114 may, for example, include an application running on the client computer 102 (or server 112), such as a device/system application, a messaging application, an email application, a web browser application, a banking application, a gaming application, and other applications that can present notifications to a user on client computer 102. The received notifications, notification data, application data, and the user's interaction with the notifications and applications may be stored on data storage 216. The hidden word processor 208 may include programming instructions to hide, partially hide, and/or display the data associated with the notification based on the results from the prediction module 202, the behavior driven module 204, and the user feedback module 206. Furthermore, the display module 210 may be used to display the notifications according to the programming instructions associated with the hidden word processor 208 as well as based on the results from the prediction module 202, the behavior driven module 204, and the user feedback module 206.

Referring now to FIG. 3, an exemplary diagram 300 illustrating the natural language processing techniques associated with the prediction module 202 according to one embodiment is depicted. As previously described, the notification data protection program 108A (FIG. 1) may include a prediction module 202 (FIG. 2) which may further include natural language processing techniques in association with training data to determine and detect protected/sensitive data. Furthermore, and as previously described, the natural language processing techniques associated with the prediction module 202 (FIG. 2) may include a feature detector 212 (FIG. 2) that may split, or categorize, notifications into different parts (i.e. sender, time, and token), and may also identify the features of each of the different parts. For example, a given set of notifications may be received such as:

1. From Person 1 at 10:00 am: What do you think of the job?
2. From Person 1 at 8:00 pm: Do you have time to discuss for the job?
3. From App 1 at 10:00 am: Your verification code is 0000. Please do not tell anyone else.
4. From App2 at 6:00 pm: Your validation code is 0001. Do not tell anyone else.
5. From App3 at 11:00 am: Your account 11111 has an income, the balance is $22222.
6. From App4 at 12:00 am: Your account 33333 has an income.
7. From Person2 at 10:00 am: There are 120 candies in the box.
8. From Person3 at 10:00 am: Good work with your job!
9. From Person4 at 12:00 am: Your account 4444 is in danger, please confirm at xxx.com.

With reference to FIG. 3 and the above set of notifications, the feature detector 212 (FIG. 2) may identify the sender 306, the tokens within the notification 302, and the time 308. Specifically, for example, the feature detector 212 may identify Person1, Person2, Person3, Person4, App1, App2, App3, and App4 as the senders 306 of the respective notifications above. More specifically, Person 1 may include a person from a messaging application that sends a message which is received at time 10:00 am on a user's mobile device (according to one embodiment, the feature detector 212 may identify the type of messaging application as the type of sender 306 as well as the type of person sending the message as the type of sender 306, and may include specific training instructions, i.e. rules, for each). Also, for example, App3 may include a banking application that generates and sends a notification which is received at 11:00 am on a user's mobile device. Also, and as previously described in FIG. 2, the feature detector 212 may split the content within the incoming notifications into several tokens 302. The several tokens 302 may identify keywords, characters, numbers, and/or phrases detected within the notifications. The identified keywords, characters, numbers, and/or phrases detected in the notifications may be classified according to a class coding system associated with the notification data protection program 108A (FIG. 1). Furthermore, based on training data associated with the features of the different parts of the notifications, the notification data protection program 108A (FIG. 1) may include training instructions (i.e. rules) to determine whether to hide, partially hide, and/or display the different notifications and/or specific content within the different notifications.

For example, in the first and second notifications, the notification data protection program 108A (FIG. 1) may identify the tokens 302, or keyword, "job" in the notifications. The notification data protection program 108A (FIG. 1) may also determine that the token "job" falls into a category, or class of tokens 304, that are identified by the code "1". Specifically, according to one embodiment, the notification data protection program 108A (FIG. 1) may include a class coding system to categorize or classify the several tokens 302. The notification data protection program 108A (FIG. 1) may also determine that the first and second notifications are from the same Person 1. However, the notification data protection program 108A (FIG. 1) may determine that the first notification is received at a time 10:00 am in the time column 308, while the second notification is received at a time 8:00 pm. According to one implementation, the notification data protection program 108A (FIG. 1) may include training instructions based on received training data that instructs the prediction module 202 to display notifications received from a certain sender 306, such as Person1. However, the notification data protection program 108A (FIG. 1) may also include training instructions that instructs the prediction module 202 to display notifications that are received during non-working hours (which may also depend on the sender), while instructing the prediction module 202 to hide notifications received during working hours. As such, based on the training instructions, the notification data protection program 108A (FIG. 1) may elect to fully hide the content within the first notification, and/or partially hide content within the first notification, whereby partially hiding includes hiding at least one token but not all tokens within a notification, such as the word "job", depending on the specific training instructions and the receipt time 308 of the first notification whereby 10:00 am may be a time 308 within working hours. Furthermore, the notification data protection program 108A (FIG. 1) may elect to display the second notification, and/or display certain content within the second notification, based on the receipt time 308 of the second notification whereby 8:00 pm may be a time 308 outside of working hours.

Also, as described in FIG. 3 and with reference to the above set of notifications, the third notification (from sender App1) and fourth notification (from sender App2) may include a verification code and a validation code "0000" and "0001", respectively. According to one implementation, and as previously described in FIG. 2, the notification data protection program 108A may include a token classifier 222 that may classify the tokens (i.e. keywords, numbers, characters, phrases) based on the features of the tokens identified by the feature detector 212. Specifically, the token classifier 222 may classify each token using a class coding system that includes a number and/or series of numbers. As such, according to one embodiment, verification/validation codes may be classified under the coding of "0(2)" in the class coding system as depicted in the class of tokens column 304. Specifically, and as depicted in tokens column 302 and the class of tokens column 304, the code for any detected number in the class coding system may set as code "0". Furthermore, the context of the detected number, or type of number, may be coded in parentheses following the code "0". In the case of the third and fourth notifications, the type of the number is a verification code and validation code, and the code for verification/validation codes may be set as "2" in the class coding system as seen in parentheses. Therefore, based on the class coding system, the token classifier 222 (FIG. 2) associated with the notification data protection program 108A may detect that a number is present, and more specifically, that a verification/validation code is present in each notification, and may classify the verification/validation codes as "0(2)" in the class of tokens column 304 based on the format "number(verification code)," as depicted in tokens column 302.

Also, for example, and in the case of the fifth notification from App3, the notification data protection program 108A (FIG. 1) may detect that the notification includes a number of the account type (i.e. "11111"), a number of the balance type (i.e. "$22222"), and an indication that income is present (based on the keyword "income"), as seen in tokens column 302. Based on the class coding system, the number of the account type may be represented by "0(3)" in the class of tokens column 304 (whereby, as seen in parentheses, the code for account numbers may be set as "3" in the class coding system), an indication that income is present may be represented by "4" in the class of tokens column 304 (based on the keyword "income" being classified as the number 4), and the number of the balance type may be represented by "0(5)" in the class of tokens column 304 (where, as seen in parentheses, the code for a number representing a balance may be set as "5" in the class coding system).

Furthermore, for example, the notification data protection program 108A (FIG. 1) may include training instructions based on received training data that instructs the prediction module 202 to hide numbers of the account type. However, the notification data protection program 108A (FIG. 1) may also include training instructions based on received training data that instructs that the prediction module 202 may display certain numbers that include a number of the account type based on the sender 306. Therefore, while the notification data protection program 108A (FIG. 1) may hide the number of the account type in the fifth and sixth notifications when presenting the notification to the user due to the sender 306 being, for example, a banking application (in this case App3 and App4), the notification data protection program 108A (FIG. 1) may display the number of the account type in the ninth notification based on the sender 306 being a certain individual, such as Person4 in the ninth notification.

Figure 4:
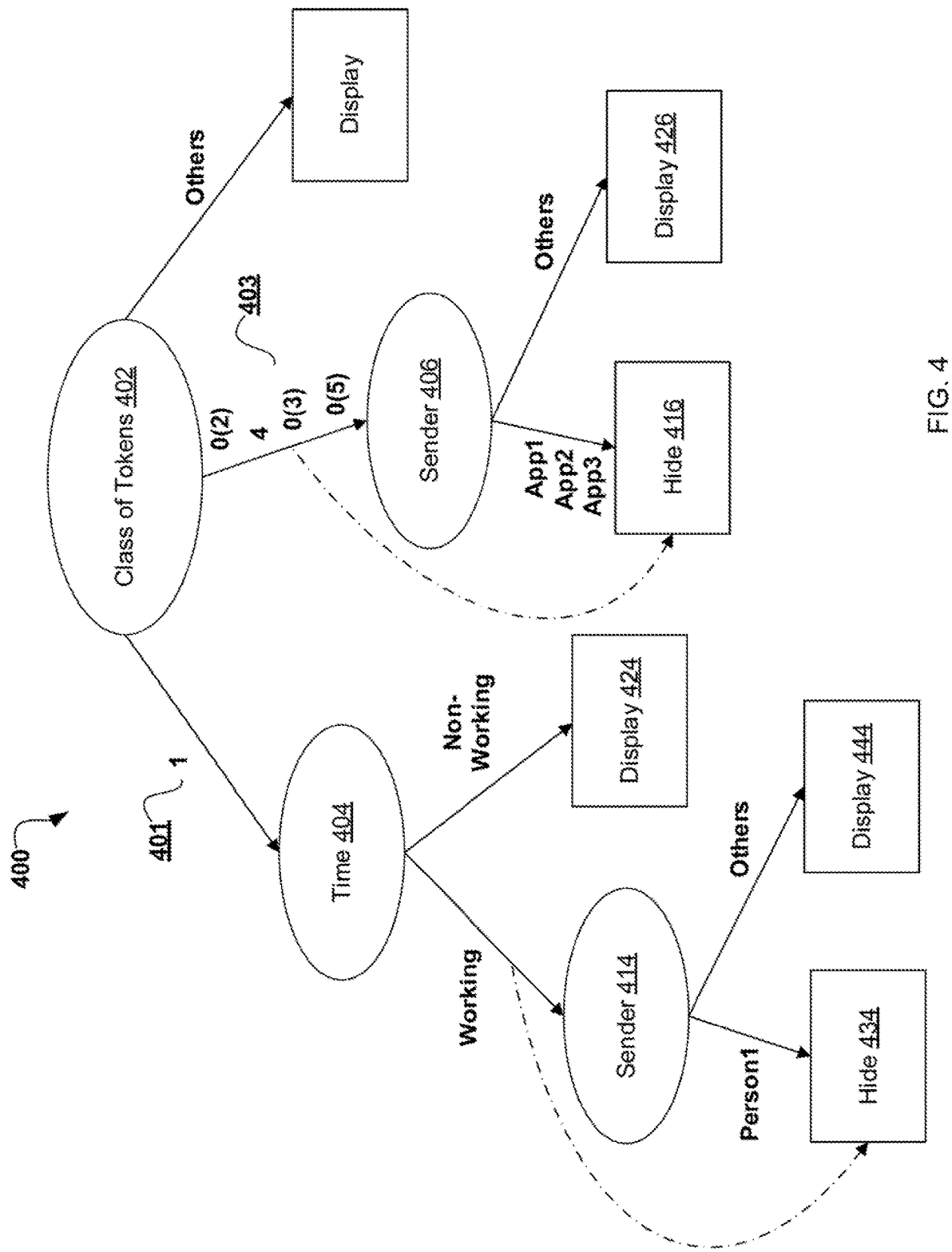
FIG. 4 is an example of a decision forest tree based on training instructions derived from training data associated with the notification data protection program.

Referring now to FIG. 4, an example of a decision forest tree 400 based on training instructions derived from training data associated with the notification data protection program 108A (FIG. 1) and based on the exemplary chart 300 in FIG. 3 is depicted. As previously described in FIG. 3, the notification data protection program 108A (FIG. 1) may include training instructions based on training data to determine whether to display or hide content within the different notifications. Additionally, the notification data protection program 108A (FIG. 1) may generate a decision forest tree 400 based on the training instructions. The decision forest tree 400 may be internal to the notification data protection program 108A (FIG. 1) and/or displayed by the notification data protection program 108A (FIG. 1) to the user via a user interface. The decision forest tree 400 may outline a deterministic path for displaying, hiding, and/or partially hiding content within a notification based on the training instructions associated with the notification data protection program 108A (FIG. 1).

For example, and as previously described in FIG. 3, the notification data protection program 108A (FIG. 1) may identify the tokens 302 (FIG. 3), or keywords, "job" in the first and second notifications that are also classified by the code "1". The notification data protection program 108A (FIG. 1) may also determine that the first and second notifications are from the same Person 1. The notification data protection program 108A (FIG. 1) may further determine that the first notification is received at a time 10:00 am in the time column 308 (FIG. 3), while the second notification is received at a time 8:00 pm. According to one implementation, the notification data protection program 108A (FIG. 1) may include training instructions based on received training data that instructs the prediction module 202 to display notifications received from a certain sender 306 (FIG. 3). However, the notification data protection program 108A (FIG. 1) may also include training instructions that instructs the prediction module 202 to display certain notifications that are received during non-working hours (which may also depend on the sender), while instructing the prediction module 202 to hide certain notifications received during working hours.

Accordingly, and as described in FIG. 4, the notification data protection program 108A (FIG. 1) may generate a decision forest tree 400 depicting the decision by the notification data protection program 108A (FIG. 1) to display or hide content within the first and second notifications. Specifically, the decision forest tree 400 may begin by identifying the class of tokens 402. Thereafter, the path for the first and second notifications may be outlined starting from code "1" at 401. More specifically, and as previously described, the token in the first and second notifications may include the keyword "job" as depicted by the code "1" at 401. The notification data protection program 108A (FIG. 1) may then identify the time that the notification is received by the client device 202 at 404, i.e. working hours or non-working hours. For example, according to one embodiment, the notification data protection program 108A (FIG. 1) may determine user working hours based on training data received via a user's input through a user interface, such as the UI interaction module 214, and/or cognitively determine user working hours based on global positioning satellite (GPS) location information associated with the user's client device 202 (FIG. 2) during certain hours. In response to the notification data protection program 108A (FIG. 1) determining that the second notification includes the term "job" and that the notification is received at 8:00 pm, a time potentially not within the user's working hours, the notification data protection program 108A (FIG. 1) may determine to display all of the content, along with the term "job", within the second notification at 424 according to the training instructions previously described. However, in response to the notification data protection program 108A (FIG. 1) determining that the first notification is received at 10:00 am, a time potentially within the user's working hours, the notification data protection program 108A (FIG. 1) may automatically hide the content within the first notification at 434; or as depicted in FIG. 4, and based on further training instructions, the notification data protection program 108A (FIG. 1) may proceed to identifying the sender at 414 to determine whether any further training instructions would allow content within the first notification to be displayed from that specific sender 306 (FIG. 3). In one embodiment, the notification data protection program 108A (FIG. 1) may determine that a notification from Person 1 during work hours should be fully or partially hidden at 434, while notifications received from other senders may be displayed at 444.

Also, for example, and as previously described in FIG. 3, the notification data protection program 108A (FIG. 1) may identify tokens 302 (FIG. 3) that include numbers. More specifically, the notification data protection program 108A (FIG. 1) may identify numbers that include verification/validation codes, account numbers, income, and balance as depicted in FIG. 3 for the third, fourth, and fifth notifications. Accordingly, and as described in FIG. 4, the notification data protection program 108A (FIG. 1) may generate a decision forest tree 400 depicting the decision by the notification data protection program 108A (FIG. 1) to display, hide, and/or partially hide content within the third, fourth, and fifth notifications. Specifically, the decision forest tree 400 may begin at the class of tokens 402 by identifying the class of tokens which include verification/validation codes "0(2)", account numbers "0(3)", income "4", and balance "0(5)" as depicted at 403. According to one embodiment, in response to the notification data protection program 108A (FIG. 1) determining that the third, fourth, and fifth notifications include any one of these codes, the notification data protection program 108A (FIG. 1) may automatically hide the specific numbers while displaying other content within the third, fourth, and fifth notification at 416; or as depicted in FIG. 4, based on further training instructions, the notification data protection program 108A (FIG. 1) may proceed to identifying the sender at 406 to determine whether any training instructions would allow numbers within the first notification to be displayed from that specific sender 406 (FIG. 3). In one embodiment, the notification data protection program 108A (FIG. 1) may determine that numbers within notifications from App1, App2, and App3 should be hidden at 416, while notifications received from other senders may be displayed at 426.

Figure 5:
FIG. 5 is an exemplary chart illustrating training data received by an aspect of the present invention for generating behavior driven training instructions according to one embodiment.

Referring now to FIG. 5, an exemplary chart 500 illustrating training data received by the behavior driven module 204 (FIG. 2) for generating behavior driven training instructions according to one embodiment is depicted. As previously described, the behavior driven module 204 (FIG. 2) may be used to train the prediction module 202 (FIG. 2). Specifically, based on a user's behavior and/or previous user behavior with regard to particular notifications, the behavior driven module 204 (FIG. 2) may be used to provide training instructions to help further determine/predict whether certain similar notifications, and/or similar content within a notification, are important, unimportant, and/or confidential to the user and whether the similar content should be hidden, partially hidden, or displayed. More specifically, the training instructions generated by the behavior driven module 204 may be based on user behavior received by the behavior module 204 that may alter, refine, and/or be combined with the training instructions that are associated with the prediction module 202 in order to tailor the hiding and displaying of certain notifications, and/or hiding of certain content within a notification, to a user.

For example, when a message notification is received from a messaging application, the notification data protection program 108A (FIG. 1) may capture the user's behavior 502 with respect to the message and may make a record of the captured user's behavior on the behavior driven module 204 (FIG. 2) and data storage 216 (FIG. 2), whereby the user's behavior 502 may include actions such as those enumerated in FIG. 5, which may include: reading the message, copying the message, replying to the message, sharing/forwarding the message, deleting the message, deleting content within the message, locking the message, etc. The description column 504 may further include training data that provides more detail on the user's behavior, such as the user sharing the message with friends or a friend circle, or the user forwarding the message to other contacts. The time relevant column 506 records the time at which the user performs the various user actions. Specifically, the notification data protection program 108A (FIG. 1) may determine or initially include programming instructions and/ or calculations to determine that the timing of some user actions 502 may be more relevant than other user actions. For example, the notification data protection program 108A (FIG. 1) may determine that the time at which the user action including reading the message, replying to the message, and sharing the message may be more relevant than the time at which the user copies the message or deletes the message. The behavior module 204 (FIG. 2) may also provide a weight of importance and confidentiality 508 that is based on the combination of the user's behavior 502, the description 504, and the time relevance 506. According to one embodiment, the weight of importance and confidentiality 508 may be measured as low, medium, high, or of unknown importance and confidentiality. For example, the user action 502 of reading a message and the specific time at which the user reads the message may be of high importance and possibly confidential. According to one embodiment, the notification data protection program 108A (FIG. 1) may determine, or initially include programming instructions and/or calculations to determine, the weight of importance and confidentiality 508 of user actions 502 based on the combination of the user's behavior 502, the description 504, and the time relevance 506.

Furthermore, the combination of the user's behavior 502 and the weight of importance and confidentiality 508 may be used in determining/predicting whether to display or hide the content of notifications based on a perceptron algorithm. Specifically, according to one embodiment, the user's behavior 502 and the weight of importance and confidentiality 508 (which is derived from the combination the user's behavior 502, the description 504, and the time relevance 506) may be used as input vectors in the following perceptron algorithm based on the associated variables (x1 . . . xN, and w1 . . . wN) displayed in the user's behavior column 502 and the weight of importance and confidentiality column 508, respectively:

(1) y=f(x1*w1+x2*w2+x3*w3+ . . . +xN*wN+w0)
(2) where f(x) is a step function, $$f(x) = \begin{cases} 1 & x > 0 \\ 0 & \text{otherwise} \end{cases}$$

(3) and w0 is a bias term.

In the above perceptron algorithm associated with the behavior driven module 204, if the output vector y is 1, the notification content should be hidden or partially hidden; and if the output vector y is 0, the notification content should be displayed. For example, the notification data protection program 108A (FIG. 1) may capture when a user reads a message, replies to the message, and then deletes the message immediately. According to programming instructions, the notification data protection program 108A (FIG. 1) may tag each of the user's actions with a weight of "high IC" (abbreviation of Important & Confidential). Furthermore, by inputting the user's behavior 502 and the weight of importance and confidentiality 508 in the perceptron algorithm, the notification data protection program 108A (FIG. 1) may determine the output vector y is 1, and therefore, may determine/predict to hide all of the content within the notification and similar future notifications. The output from the behavior module 204 may include the user's behavior with respect to a particular notification and be provided as training data to the prediction module 202 (FIG. 2), which in turn, may alter/refine the training instructions associated with the prediction module 202 (FIG. 2). The training data may also include the particular notification, which may be stored on a notification storage device discussed in FIG. 6. Furthermore, training instructions may be included in the prediction module 202 for displaying, hiding, and/or partially hiding content that may be combined with the training instructions from the behavior driven module 204.

Figure 6:
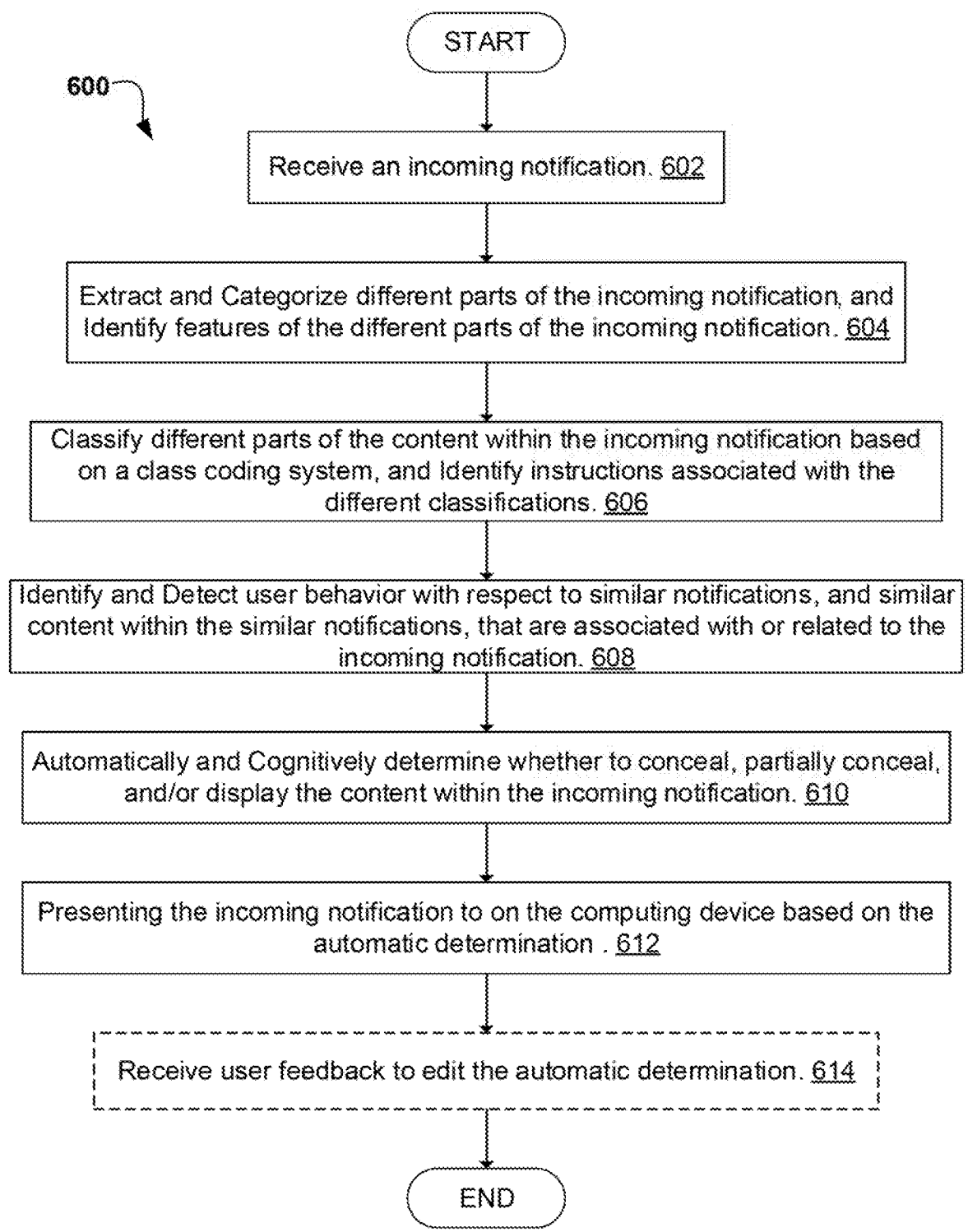
FIG. 6 is an operational flowchart illustrating the steps carried out by a program for automatically detecting and concealing content associated with an incoming notification in response to receiving and presenting the incoming notification on a computing device according to one embodiment.

Referring now to FIG. 6, an operational flowchart 600 illustrating the steps carried out by a program for automatically and cognitively detecting and concealing content associated with a notification when dynamically presenting the notification on a computing device according to one embodiment is depicted. Specifically, at 602, the notification data protection program 108A, 108B (FIG. 1) may receive an incoming notification on a computing device 102 (FIG. 1). As previously described in FIG. 1, the notification data protection program 108A (FIGS. 1 and 2) may run on client computer 102 (FIG. 1) along with one or more software programs 114 (FIG. 1). The one or more software programs 114 (FIG. 1) may include application programs such as mobile apps running on client computer 102. The notification data protection program 108A (FIG. 1) may interact with the one or more software programs 114, which may generate notifications to the client computer 102 that may be received by the notification data protection program 108A (FIG. 1). For example, the notification data protection program 108A, 108B (FIG. 1) may receive a series of notifications from a messaging app and/or a banking app running on client computer 102 (FIG. 1) that may include message content and banking content, respectively, as previously described above and with respect to FIG. 3.

Thereafter, at 604, the notification data protection program 108A, 108B (FIG. 1) may extract and categorize different parts of the incoming notification, and identify features associated with the different parts of the incoming notification, in response to receiving the incoming notification. As previously described in FIG. 2, the notification data protection program 108A, 108B (FIG. 1) may include a prediction module 202 (FIG. 2) that may use natural language processing techniques to identify content associated with a notification and within the notification. Specifically, the natural language processing techniques associated with the prediction module 202 may include a feature detector 212 that may split, or categorize, the notification into different parts. Accordingly, the notification data protection program 108A, 108B (FIG. 1) may use the feature detector 212 (FIG. 2) associated with the prediction module 202 (FIG. 2) to identify and extract a sender of the notification, a time that the notification is received, and one or more tokens (i.e. keywords and/or phrases) within the notification. Furthermore, the feature detector 212 may also identify the features of the different parts of the notification, whereby identifying the features includes identifying the type of sender (i.e. a person, an app, a device/system, etc.), a type of time (i.e. working hours, non-working hours, busy, not busy, sleep, awake, etc.), and a type of token (i.e. a type of number, a type of an event, a type of subject—job, bank, medical, etc.).

Then, at 606, the notification data protection program 108A, 108B (FIG. 1) may classify different parts of the content within the notification based on a class coding system as well as identify instructions associated with the different classifications. As previously described at 604, the notification data protection program 108A, 108B (FIG. 1) may identify and extract tokens, i.e. keywords, characters, and/or phrases, and features of an incoming notification by splitting an incoming notification into different parts and identifying several tokens (i.e. keywords, characters, and/or phrases) as well as the features of each token. The notification data protection program 108A, 108B (FIG. 1) may also include a token classifier 222 (FIG. 2) to classify each token based on the identified features. Specifically, and as previously described in FIG. 2, the token classifier 222 may classify the token, or keyword/phrase, based on the feature of the token identified by the feature detector 212 by using a class coding system that includes a number and/or series of numbers.

For example, and as previously described with respect to FIG. 3, the notification data protection program 108A, 108B (FIG. 1) may detect a notification that includes verification code "0000". According to one implementation, verification codes may be classified under the coding of "0(2)" in the class coding system as depicted in the class of tokens column 304 (FIG. 3). Specifically, and as depicted in tokens column 302 (FIG. 3) and the class of tokens column 304 (FIG. 3), the code for a detected number in the class coding system may set as code "0". Furthermore, the context of the detected number, or type of number, may be coded in parentheses following the code "0". In the case of the third notification, the type of the number is a verification code, and the code for verification codes may be set as "2" in the class coding system as seen in parentheses. Therefore, the notification data protection program 108A, 108B (FIG. 1) may detect that a number is present, and more specifically, that a verification code is present in a notification based on the class coding system, which may classify verification codes as "0(2)" in the class of tokens column 304 (FIG. 3) based on the form "number(verification code)" and as depicted in tokens column 302 (FIG. 3).

Additionally, the notification data protection program 108A, 108B (FIG. 1) may also identify instructions for concealing, partially concealing, and hiding content based on the different classification codes. For example, and as previously described in FIG. 4, in response to the notification data protection program 108A (FIG. 1) determining that a notification includes any one of a verification/validation code "0(2)", an account number "0(3)", income "4", and a balance "0(5)" as depicted at 403 in FIG. 4, the notification data protection program 108A (FIG. 1) may identify training instructions to automatically hide the specific numbers while displaying other content within the notification at 416. However, based on further training instructions, the notification data protection program 108A (FIG. 1) may also proceed to identifying the sender at 406 to determine whether any training instructions would allow such numbers within the notification to be displayed from a specific sender 406 (FIG. 3).

Furthermore, at 608, the notification data protection program 108A, 108B (FIG. 1), may identify and detect user behavior with respect to similar notifications, and similar content within the similar notifications, that are associated with or related to the incoming notification. As previously described in FIG. 5, based on a user's behavior and/or previous user behavior with regard to particular notifications, the behavior driven module 204 (FIG. 2) may be used to provide training instructions to help further determine/predict whether certain similar notifications, and/or similar content within a notification, are important, unimportant, and/or confidential to the user and whether the similar content should be hidden, partially hidden, or displayed. For example, when a message notification is received from a messaging application, the user's behavior 502 may include actions such as those enumerated in FIG. 5, which may include: reading the message, copying the message, replying to the message, sharing/forwarding the message, deleting the message, deleting content within the message, locking the message, etc. The notification data protection program 108A (FIG. 1) may capture the user's behavior 502 with respect to the message and may make a record of the captured user's behavior on the behavior driven module 204 (FIG. 2) and on data storage 216 (FIG. 2). The.

Next, at 610, based on the identified features associated with the different parts of the notification at 604, the instructions associated with each classification of the different parts of the content within the incoming notification at 606, and the detected user behavior with respect to the similar notifications and the similar content within the similar notifications stored on data storage 216, the notification data protection program 108A, 108B (FIG. 1) may automatically and cognitively determine whether to conceal, partially conceal, and/or display the content within the notification on the computing device 102 (FIG. 1). Specifically, and as previously illustrated in FIG. 2, the notification data protection program 108A may include a prediction module 202, a behavior driven module 204, and a user feedback module 206. Specifically, the prediction module 202 and the behavior driven module 204 may interact with one another to determine or define what constitutes protected/sensitive data within a notification and may store the determination on data storage 216. Data storage 216 (FIG. 2) may, for example, include one or more computer-readable tangible storage devices with program/training instructions stored on at least one of the one or more computer-readable tangible storage devices. Additionally, when presenting the notification, the prediction module 202 and the behavior driven module 204 may determine whether content within the notification should be hidden, partially hidden, and/or displayable based on the training data.

For example, and with reference to FIG. 3, the notification data protection program 108A (FIG. 1) may use prediction module 202 (FIG. 2) to identify numbers that include verification/validation codes, account numbers, income, and balance as depicted in FIG. 3 for the third, fourth, and fifth notifications. Accordingly, and as described in FIG. 4, the notification data protection program 108A (FIG. 1) may generate a decision forest tree 400 depicting the decision by the notification data protection program 108A (FIG. 1) to display, hide, and/or partially hide content within the third, fourth, and fifth notifications. Specifically, the decision forest tree 400 may begin at the class of tokens 402 by identifying the class of tokens which include verification/validation codes "0(2)", account numbers "0(3)", income "4", and balance "0(5)" as depicted at 403. According to one embodiment, in response to the notification data protection program 108A (FIG. 1) determining that the third, fourth, and fifth notifications include any one of these codes, the notification data protection program 108A (FIG. 1) may automatically hide the specific numbers while displaying the other content within the third, fourth, and fifth notification at 416; or as depicted in FIG. 4, based on further training instructions, the notification data protection program 108A (FIG. 1) may proceed to identifying the sender at 406 to determine whether any training instructions would allow numbers within the first notification to be displayed from that specific sender 406 (FIG. 3).

Also, for example, and with reference to FIG. 5, the behavior driven module 204 (FIG. 2) may be used to train the prediction module 202 (FIG. 2). Specifically, based on a user's behavior, the behavior driven module 204 (FIG. 2) may be used to provide training instructions to help further determine/predict whether certain notifications, and/or certain data within a notification, are important or unimportant, and/or confidential to the user. More specifically, for example, when a message is received from a messaging application, the notification data protection program 108A (FIG. 1) may capture the user's behavior 502 with respect to the message and may make a record of the captured user's behavior on the behavior driven module 204, whereby the user's behavior 502 may include actions such as those enumerated in FIG. 5, which may include: reading the message, copying the message, replying to the message, sharing/forwarding the message, deleting the message, deleting content within the message, locking the message, etc. As described with respect to FIG. 5, the training instructions generated by the behavior driven module 204 may alter, refine, and/or be combined with the training instructions that are associated with the prediction module 202 in order to tailor the hiding and displaying of content within notifications, and the results of the behavior driven module 204 may also be stored on data storage 216.

According to one embodiment, the user feedback module 206 may also be used to determine or define what constitutes protected/sensitive data within a notification as well as determine whether content within the notification should be concealed, partially concealed, and/or displayable. As previously described, the user feedback module 206 may be used to train the prediction module 202, as well as train the behavior module 204. Specifically, using a user interface (UI) interaction module 214 (FIG. 2) (i.e. a user interface), the notification data protection program 108A (FIG. 1) may capture user feedback to one or more prediction results that are provided by the prediction module 202, and may make a record of the captured feedback on the user feedback module 206 for training purposes. For example, the prediction module 202 may provide a prediction result whereby the prediction result deems certain content from an application notification as not protected/sensitive data and designates that certain content as displayable within the notification. However, the user may want such content to be hidden when the notification is displayed, and the notification data protection program 108A (FIG. 1) may allow the user to hide such content using a user interface, such as the UI interaction module 214. Thereafter, the user feedback including the user changing the designation of that certain content to hidden in the UI interaction module 214 may be recorded by the user feedback module 206, stored on data storage 216, and provided as training data to the prediction module 202 and the behavior module 204 for future notifications.

Then, at 612, based on the automatic determination whether to conceal, partially conceal, or display the content within the notification, the notification data protection program 108A, 108B (FIG. 1) may present the notification to the user on the user's computing device. In response to an automatic determination to hide and/or partially hide the content within the incoming notification, the notification data protection program 108A, 108B (FIG. 1) may process the incoming notification using the hidden word processor 208 (FIG. 2) to hide or partially hide the content within the incoming notification. For example, in response to the notification data protection program 108A (FIG. 1) determining that the notification includes a verification code, the notification data protection program 108A (FIG. 1) may automatically hide the specific number representing the verification code (i.e. partially hide content within the notification) while displaying the other content within the notification. More specifically, for example, and as previously described in FIG. 3, the notification data protection program 108A, 108B (FIG. 1) may receive an incoming notification from App2 at 6:00 pm that may include content such as: "Your validation code is 0001. Do not tell anyone else." Based on the determination at 608, and the hidden word processor at 610, the notification data protection program 108A, 108B (FIG. 1) may present the notification to the user by displaying the name of the app that generated the notification and the time of the notification, while partially concealing content within the notification, whereby the partially concealed content may include the verification code. Specifically, the verification code may be replaced by "XXXX" (i.e. "Your validation code is XXXX. Do not tell anyone else.") or concealed by a series of other characters that do not show the actual verification code, and/or blurred or simply not shown at all within the notification.

Furthermore, according to one embodiment, at 614, the notification data protection program 108A, 108B (FIG. 1) may receive user feedback to edit the automatic determination. As previously described, the notification data protection program 108A, 108B (FIG. 1) may provide an automatic determination that certain content within a notification is not protected/sensitive data and designates that certain content as displayable within the notification. However, the user may want such content to be hidden when the notification is displayed, and the notification data protection program 108A (FIG. 1) may allow the user to hide such content using a user interface, such as the UI interaction module 214. Thereafter, the user feedback including the user changing the designation of that certain content to hidden in the UI interaction module 214 may be recorded by the user feedback module 206, stored on data storage 216, and provided as training data to the prediction module 202 and the behavior module 204 for future notifications.

It may be appreciated that FIGS. 1-6 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
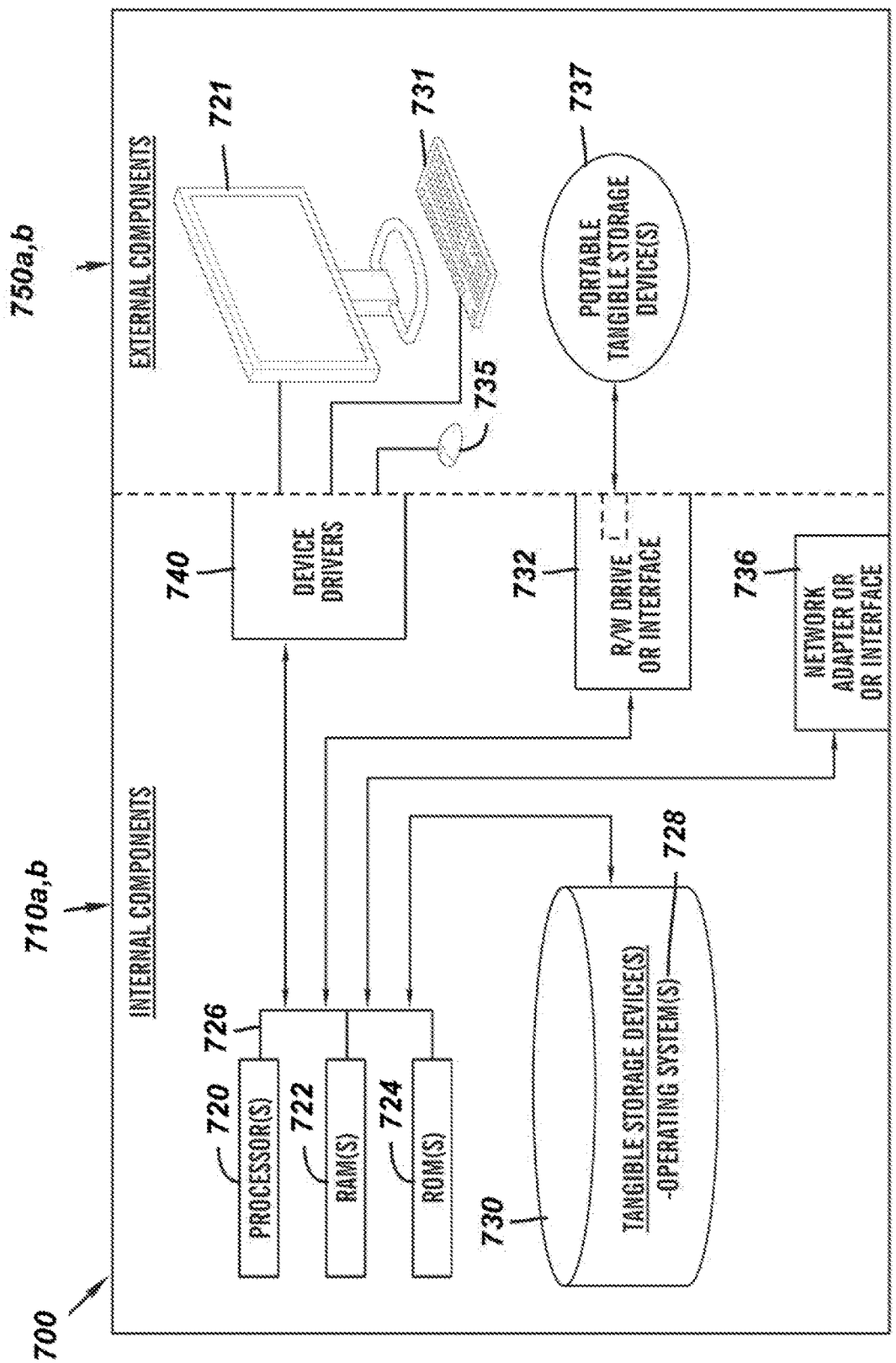
FIG. 7 is a block diagram of the system architecture of the program for automatically detecting and concealing content associated with an incoming notification in response to receiving and presenting the incoming notification on a computing device according to one embodiment.

FIG. 7 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 710, 750 is representative of any electronic device capable of executing machine-readable program instructions. Data processing system 710, 750 may be representative of a smart phone, a computer system, PDA, or other electronic devices. Examples of computing systems, environments, and/or configurations that may represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710a, b and external components 750a, b illustrated in FIG. 7. Each of the sets of internal components 710a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the notification data protection program 108A (FIG. 1) in client computer 102 (FIG. 1), and the notification data protection program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710a, b, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as an notification data protection program 108A and 108B (FIG. 1), can be stored on one or more of the respective portable computer-readable tangible storage devices 737, read via the respective R/W drive or interface 732, and loaded into the respective hard drive 730.

Each set of internal components 710a, b also includes network adapters or interfaces 736 such as a TCP/IP adapter cards, wireless Wi-Fi interface cards, or 3G or 4G wireless interface cards or other wired or wireless communication links. The notification data protection program 108A (FIG. 1) and software program 114 (FIG. 1) in client computer 102 (FIG. 1), and the notification data protection program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the notification data protection program 108A (FIG. 1) and software program 114 (FIG. 1) in client computer 102 (FIG. 1) and the notification data protection program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750a, b can include a computer display monitor 721, a keyboard 731, and a computer mouse 735. External components 750a, b can also include touch screens, virtual keyboards, touch pads, pointing devices, and other human interface devices. Each of the sets of internal components 710a, b also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
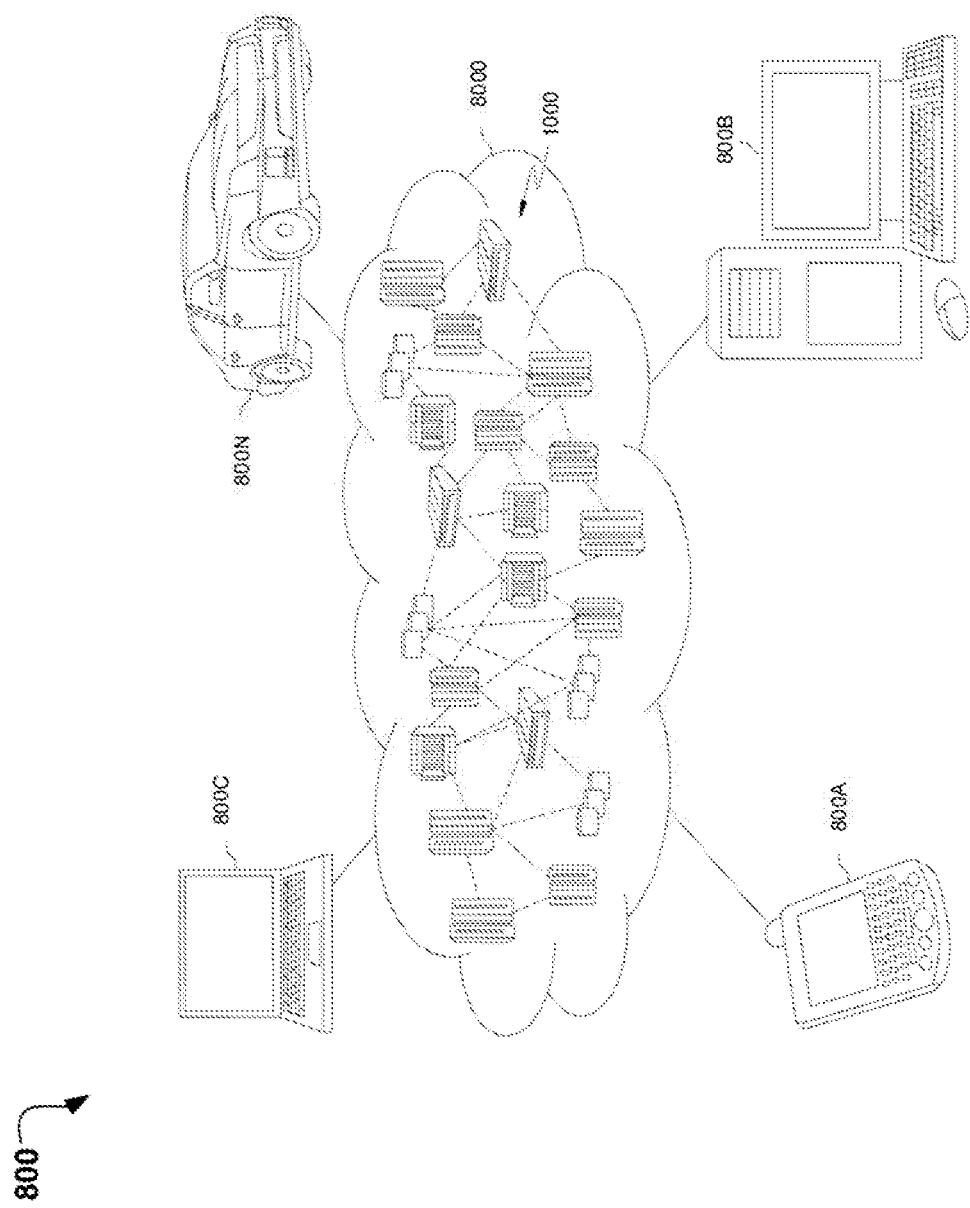
FIG. 8 is a block diagram of an illustrative cloud computing environment including the computer system depicted in FIG. 1, in accordance with an embodiment of the present disclosure.

Referring now to FIG. 8, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 8 are intended to be illustrative only and that computing nodes 100 and cloud computing environment 8000 can communicate with any type of computerized device over any type of network and/or network addressable connection (e.g., using a web browser).

Figure 9:
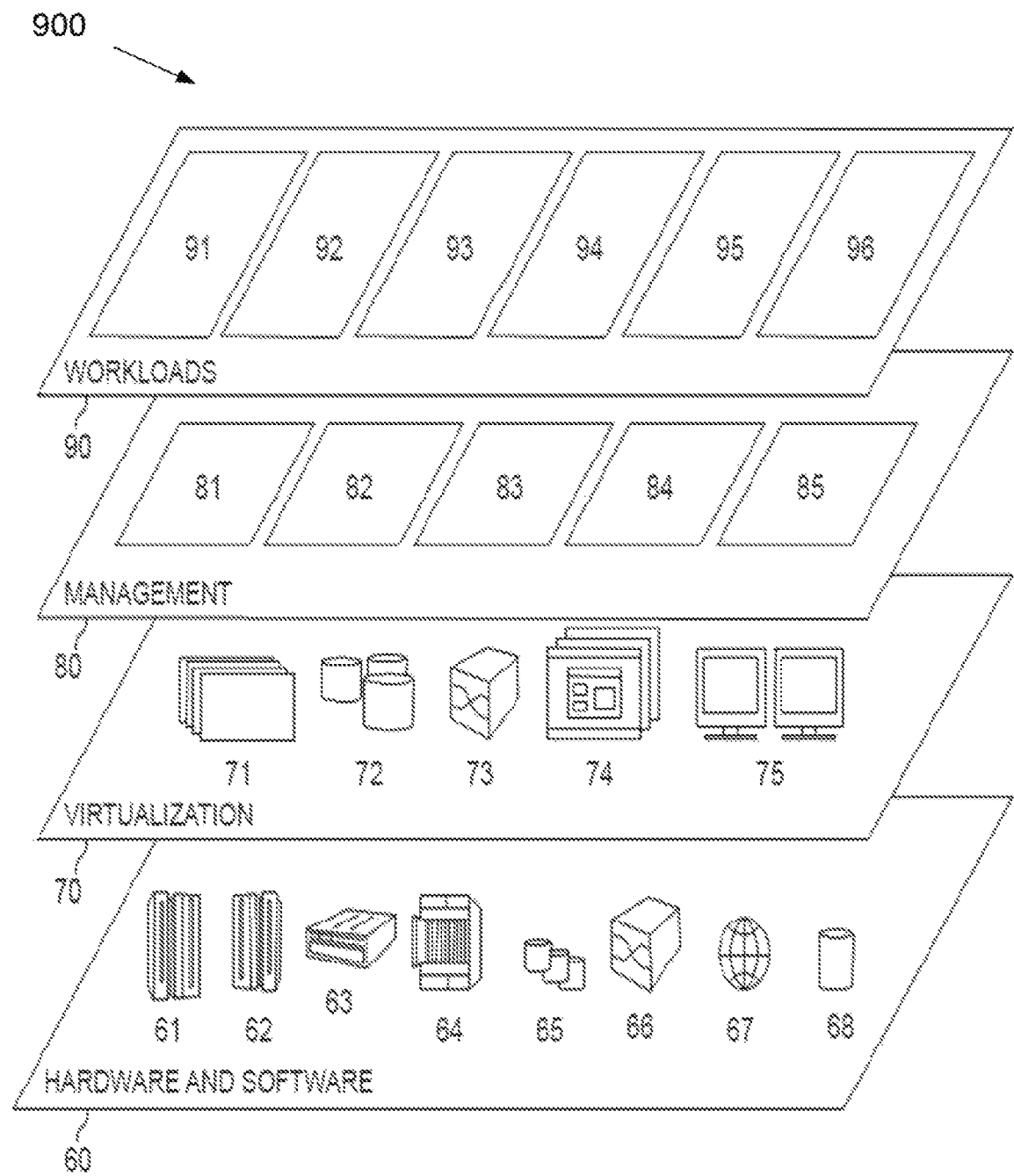
FIG. 9 is a block diagram of functional layers of the illustrative cloud computing environment of FIG. 8, in accordance with an embodiment of the present disclosure.

Referring now to FIG. 9, a set of functional abstraction layers 900 provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification data protection 96. A notification data protection program 108A, 108B (FIG. 1) may be offered "as a service in the cloud" (i.e., Software as a Service (SaaS)) for applications running on computing devices 102 (FIG. 1) and may automatically detecting and concealing content associated with an incoming notification in response to receiving and presenting the incoming notification on a computing device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically detecting and concealing content associated with an incoming notification on a computing device, the method comprising:
   in response to receiving the incoming notification, extracting and categorizing different parts of the incoming notification, and identifying features associated with each of the different parts, wherein the different parts comprise at least one sender, a time, and the content within the incoming notification;
   classifying different parts of the content within the incoming notification based on a class coding system and identifying one or more instructions associated with each classification;
   identifying and detecting user behavior with respect to similar notifications, and similar content within the similar notifications, that are associated with or related to the incoming notification, and determining user actions performed on the similar notifications;
   automatically determining whether to conceal, partially conceal, or display on the computing device the content within the incoming notification based on the identified features associated with the different parts of the incoming notification, the one or more instructions associated with each classification of the different parts of the content within the incoming notification, and the detected user behavior with respect to the similar notifications and the similar content within the similar notifications; and
   presenting the incoming notification on the computing device according to the automatic determination whether to conceal, partially conceal, or display the content within the incoming notification.

2. The method of claim 1, wherein identifying the features associated with each of the different parts of the incoming notification further comprises:
   detecting a type of sender of the at least one sender, wherein the type of sender is selected from a group comprising at least one of an application and a person;
   detecting the time that the incoming notification is received; and detecting whether the content within the incoming notification comprises keywords, phrases, numbers, and characters.

3. The method of claim 1, wherein classifying the different parts of the content within the incoming notification further comprises:
generating and assigning a code to each of the different parts of the content within the incoming notification, wherein the different parts of the content within the incoming notification and each code identifies different types of keywords, different types of numbers, and different types of characters within the content.

4. The method of claim 1:
wherein the user behavior with respect to the similar notifications and the similar content within the similar notifications are stored on and retrieved from a storage device; and
wherein the user actions are selected from a group comprising at least one of reading the similar notifications, replying to the similar notifications, copying the similar notifications, sharing the similar notifications, deleting the similar notifications, and deleting content within the similar notifications; and.

5. The method of claim 1, further comprising:
generating first instructions for concealing, partially concealing, or displaying the content within the incoming notification, wherein the first instructions are based on the identified features associated with each of the different parts of the incoming notification and based on the classification of the different parts of the content within the incoming notification;
generating second instructions for concealing, partially concealing, or displaying the content within the incoming notification, wherein the second instructions are based on the detected user behavior with respect to the similar notifications and the similar content within the similar notifications that are associated with or related to the incoming notification; and
generating third instructions for concealing, partially concealing, or displaying the content within the incoming notification, wherein the third instructions are based on user feedback in response to the automatic determination of whether to conceal, partially conceal, or display the content within the incoming notification.

6. The method of claim 5, further comprising:
automatically determining whether to conceal, partially conceal, or display the content within the incoming notification based on the generated first instructions, the generated second instructions, and the generated third instructions.

7. The method of claim 1, further comprising:
in response to the automatic determination of whether to conceal, partially conceal, or display the content within the incoming notification, receiving user feedback to edit the automatic determination.

8. A computer system for automatically detecting and concealing content associated with an incoming notification on a computing device, comprising:
one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:
in response to receiving the incoming notification, extracting and categorizing different parts of the incoming notification, and identifying features associated with each of the different parts, wherein the different parts comprise at least one sender, a time, and the content within the incoming notification;
classifying different parts of the content within the incoming notification based on a class coding system and identifying one or more instructions associated with each classification;
identifying and detecting user behavior with respect to similar notifications, and similar content within the similar notifications, that are associated with or related to the incoming notification, and determining user actions performed on the similar notifications;
automatically determining whether to conceal, partially conceal, or display on the computing device the content within the incoming notification based on the identified features associated with the different parts of the incoming notification, the one or more instructions associated with each classification of the different parts of the content within the incoming notification, and the detected user behavior with respect to the similar notifications and the similar content within the similar notifications; and
presenting the incoming notification on the computing device according to the automatic determination whether to conceal, partially conceal, or display the content within the incoming notification.

9. The computer system of claim 8, wherein identifying the features associated with each of the different parts of the incoming notification further comprises:
detecting a type of sender of the at least one sender, wherein the type of sender is selected from a group comprising at least one of an application and a person;
detecting the time that the incoming notification is received; and
detecting whether the content within the incoming notification comprises keywords, phrases, numbers, and characters.

10. The computer system of claim 8, wherein classifying the different parts of the content within the incoming notification further comprises:
generating and assigning a code to each of the different parts of the content within the incoming notification, wherein the different parts of the content within the incoming notification and each code identifies different types of keywords, different types of numbers, and different types of characters within the content.

11. The computer system of claim 8:
wherein the user behavior with respect to the similar notifications and the similar content within the similar notifications are stored on and retrieved from a storage device; and
wherein the user actions are selected from a group comprising at least one of reading the similar notifications, replying to the similar notifications, copying the similar notifications, sharing the similar notifications, deleting the similar notifications, and deleting content within the similar notifications.

12. The computer system of claim 8, further comprising:
generating first instructions for concealing, partially concealing, or displaying the content within the incoming notification, wherein the first instructions are based on the identified features associated with each of the different parts of the incoming notification and based on the classification of the different parts of the content within the incoming notification;

generating second instructions for concealing, partially concealing, or displaying the content within the incoming notification, wherein the second instructions are based on the detected user behavior with respect to the similar notifications and the similar content within the similar notifications that are associated with or related to the incoming notification; and generating third instructions for concealing, partially concealing, or displaying the content within the incoming notification, wherein the third instructions are based on user feedback in response to the automatic determination of whether to conceal, partially conceal, or display the content within the incoming notification.

13. The computer system of claim 12, further comprising:
automatically determining whether to conceal, partially conceal, or display the content within the incoming notification based on the generated first instructions, the generated second instructions, and the generated third instructions.

14. The computer system of claim 8, further comprising:
in response to the automatic determination of whether to conceal, partially conceal, or display the content within the incoming notification, receiving user feedback to edit the automatic determination.

15. A computer program product for automatically detecting and concealing content associated with an incoming notification on a computing device, comprising:
one or more tangible computer-readable storage devices and program instructions stored on at least one of the one or more tangible computer-readable storage devices, the program instructions executable by a processor, the program instructions comprising:
in response to receiving the incoming notification, program instructions to extract and categorize different parts of the incoming notification, and identify features associated with each of the different parts, wherein the different parts comprise at least one sender, a time, and the content within the incoming notification;
program instructions to classify different parts of the content within the incoming notification based on a class coding system and identify one or more instructions associated with each classification;
program instructions to identify and detect user behavior with respect to similar notifications, and similar content within the similar notifications, that are associated with or related to the incoming notification, and determine user actions performed on the similar notifications;
program instructions to automatically determine whether to conceal, partially conceal, or display on the computing device the content within the incoming notification based on the identified features associated with the different parts of the incoming notification, the one or more instructions associated with each classification of the different parts of the content within the incoming notification, and the detected user behavior with respect to the similar notifications and the similar content within the similar notifications; and
program instructions to present the incoming notification on the computing device according to the automatic determination whether to conceal, partially conceal, or display the content within the incoming notification.

16. The computer program product of claim 15, wherein the program instructions to identify the features associated with each of the different parts of the incoming notification further comprises:
program instructions to detect a type of sender of the at least one sender, wherein the type of sender is selected from a group comprising at least one of an application and a person;
program instructions to detect the time that the incoming notification is received; and
program instructions to detect whether the content within the incoming notification comprises keywords, phrases, numbers, and characters.

17. The computer program product of claim 15, wherein the program instructions to classify the different parts of the content within the incoming notification further comprises:
program instructions to generate and assign a code to each of the different parts of the content within the incoming notification, wherein the different parts of the content within the incoming notification and each code identifies different types of keywords, different types of numbers, and different types of characters within the content.

18. The computer program product of claim 15:
wherein the user behavior with respect to the similar notifications and the similar content within the similar notifications are stored on and retrieved from a storage device; and
wherein the user actions are selected from a group comprising at least one of reading the similar notifications, replying to the similar notifications, copying the similar notifications, sharing the similar notifications, deleting the similar notifications, and deleting content within the similar notifications.

19. The computer program product of claim 15, further comprising:
program instructions to generate first instructions for concealing, partially concealing, or displaying the content within the incoming notification, wherein the first instructions are based on the identified features associated with each of the different parts of the incoming notification and based on the classification of the different parts of the content within the incoming notification;
program instructions to generate second instructions for concealing, partially concealing, or displaying the content within the incoming notification, wherein the second instructions are based on the detected user behavior with respect to the similar notifications and the similar content within the similar notifications that are associated with or related to the incoming notification; and
program instructions to generate third instructions for concealing, partially concealing, or displaying the content within the incoming notification, wherein the third instructions are based on user feedback in response to the automatic determination of whether to conceal, partially conceal, or display the content within the incoming notification.

20. The computer program product of claim 19, further comprising:
program instructions to automatically determine whether to conceal, partially conceal, or display the content within the incoming notification based on the generated first instructions, the generated second instructions, and the generated third instructions.

* * * * *